UNITED STATES PATENT OFFICE.

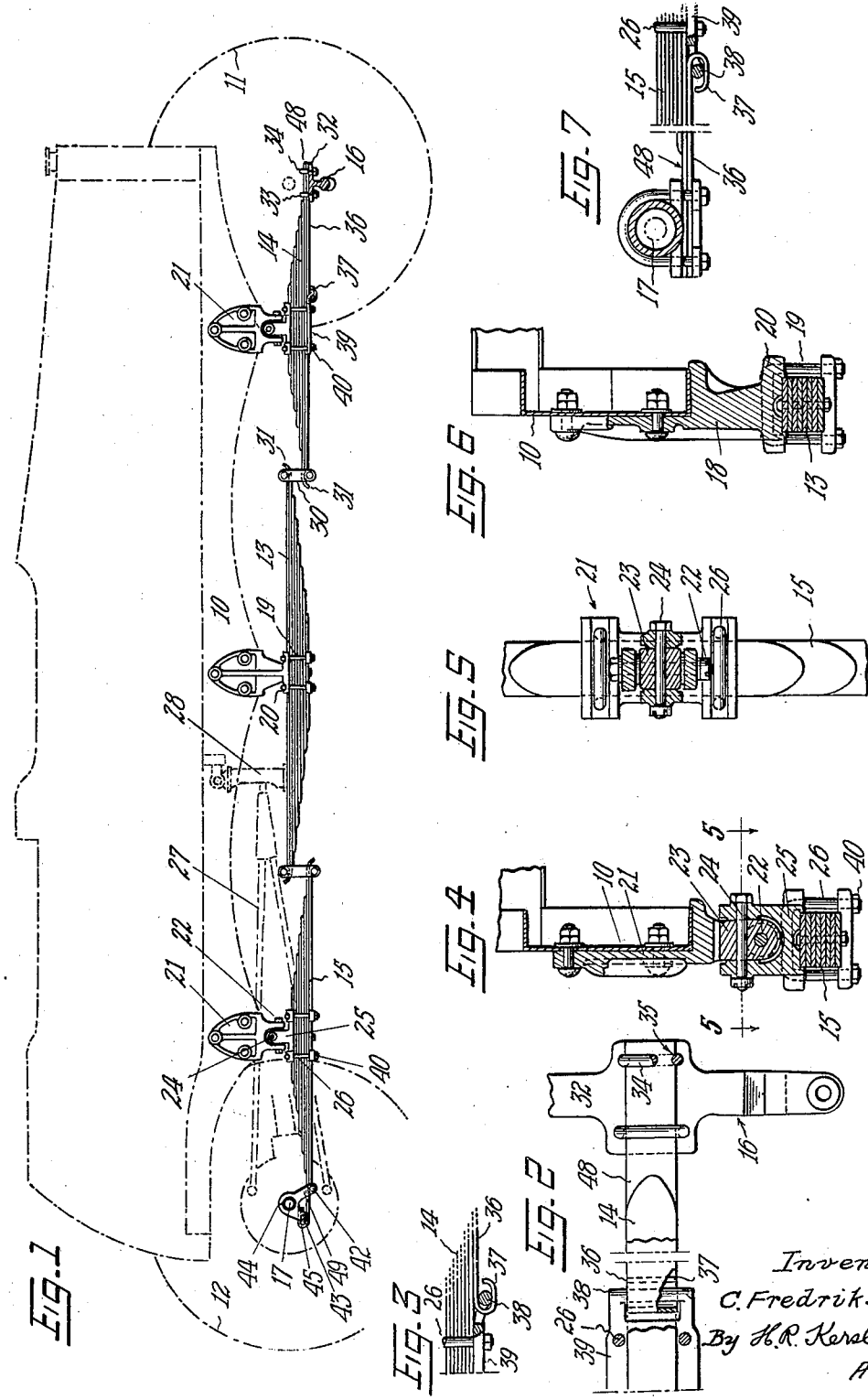

CHRISTIAN FREDRIKSEN, OF CROYDON, NEAR SYDNEY, NEW SOUTH WALES, AUSTRALIA.

SPRING SUSPENSION FOR AUTOMOBILES.

1,394,724.  Specification of Letters Patent.  Patented Oct. 25, 1921.

Application filed October 14, 1919. Serial No. 330,554.

*To all whom it may concern:*

Be it known that I, CHRISTIAN FREDRIKSEN, subject of the King of Great Britain and Ireland, residing at The Fountain, Bay street, Croydon, near Sydney, in the county of Cumberland and State of New South Wales, Commonwealth of Australia, have invented certain new and useful Improvements in Spring Suspensions for Automobiles, of which the following is a specification.

The object of this invention is to minimize jolting and vertical oscillation of the bodies of automobiles when driving over rough or lumpy road surfaces, and it consists in a springing system comprising three leaf springs at either side of the car, said springs in each set being located end to end with their adjacent ends shackled together, and the axles fixed to the outer ends of the extreme springs, and all said springs disposed longitudinally of the vehicle.

According to this invention the spring assembly for either side of an automobile consists of a longitudinally disposed suspension leaf spring firmly fixed at its crown at a mid position on the frame side member, and in alinement with said suspension spring at either end thereof, two oscillating platform leaf springs, the crowns of which are carried in trunnion or gimbal mountings, positioned near either end of the frame side member. The adjacent eyes of the suspension spring and of the oscillating platform springs are shackled together respectively, and the outer ends of the oscillating platform springs are attached to the fore axle and the rear axle respectively. The axles are thus carried at the ends of compound springs, each consisting of three double-arm leaf members connected in series on either side of the vehicle.

In the accompanying drawings:—

Figure 1 is a side elevational view showing the springing system on one side of an automobile, which is shown in dotted outline;

Fig. 2 is a fragmentary plan view illustrative of the mounting of a support leaf for the main leaf of the fore spring and the method adopted for securing the forward end of the fore spring to the front axle;

Fig. 3 is a fragmentary detail sectional elevation corresponding with left hand portion of Fig. 2;

Fig. 4 is a transverse section illustrative of a pivotal (gimbal) crown mount for the platform springs;

Fig. 5 is a horizontal section and plan on the line 5—5 Fig. 4;

Fig. 6 is a transverse section illustrative of the crown mounting for the suspension spring;

Fig. 7 is a longitudinal sectional elevation explanatory of a method of fixing the rear end of the rear platform spring to the back axle and a method of fitting a support leaf for the main leaf of said spring.

The longitudinal suspension leaf spring functions as two independent cantaliver leaf springs. It adds virtual length to the platform springs, thus permitting great range of axle movement, augmenting resiliency, and introducing into the springing system a period of oscillation longer than the natural period of the individual platform springs. Vibratory and oscillatory movements are therefore damped, so that the vehicle body suffers only limited disturbance by vertical movements of the axle consequent upon the wheels running over uneven surfaces. The crown of the suspension spring may be located either centrally of the length of that spring or forward or rear of that position as may be found best suited to procure the desirable suspension of the load for insuring easiness of riding in the vehicle. It is not essential that the trunnions or gimbals which carry the platform springs should be located mid-way of the length of those springs, as their arms may be either of equal or of unequal length. Usually, however, the three springs in either set are constructed with their arms of equal lengths. The several springs should be proportioned so that when the vehicle is carrying its normal load the main leaves set approximately straight.

It is desirable to provide means whereby failure of the main leaf or the main support leaf of any one of the springs will not incapacitate the springs. The method of fixing the outer ends of the lever springs to the axles is of secondary importance, but certain preferred forms of mounting for this purpose are hereinafter described.

To minimize risk of lateral play of the springs which would result in side swaying or yawing of the vehicle body, particularly when swinging around corners, a system of diagonally disposed truss stays consisting of rods or wire lines connecting the shackles to the spring crown mountings at the opposite side of the vehicle may be fitted. This feature is not claimed as a novelty as it is known in connection with other springing systems.

10 represents the frame side member of an automobile; 11 a fore wheel, and 12 a rear wheel thereof. 13 is the suspension spring; 14 the fore platform spring, and 15 the rear platform spring. 16 is the front axle and 17 the rear axle casing. 18 is the bracket pad mounting for the suspension spring 13; it is fixed to the frame 10 approximately midway of its length and the crown of the suspension spring 13 is clamped to it by bolts 19 or similarly. The mounting 18 with the spring carrier pad 20 is immovable relatively to the frame 10, so that either arm of the spring 13 functions as a cantaliver. The mountings for the platform springs 14 and 15 are substantially identical. In the case of each of these mountings, 21 is a bracket plate fixed to the frame 10, 22 a pivot bolt through lugs on the lower part of same carrying a gimbal block 23, and 24 is a cross pivot bolt passing through said gimbal block and through the jaws of the spring pad plate 25. The crowns of the springs 14 and 15 are secured to the pad plates 25 by bolts 26 or otherwise. If desired, the fore and aft pivot bolt 22 may be omitted from the structure and the block 23 in that case forms part of the bracket structure, so that the platform springs then have freedom for oscillatory movement in the plane of their length only. The provision of the transverse pivot bolt 22 permits transverse oscillation of these springs to minimize internal stress caused when the fore and rear axles are out of parallelism, as, for instance, when one of the wheels of the car is "ditched". Means for lubricating the gimbal bolts are not illustrated, but usual means known in the art are fitted for this purpose. 27 is a rear axle torsion truss and 28 the spring carrier for the head of said truss; these parts are shown in dotted lines and do not form a part of the present invention. The eyes of the adjacent leaf ends in the springs 13, 14, and 15 are connected in series by shackles 29 and 30. The support leaves, that is the leaves next the outer or main leaves of each spring, are extended to underlie the eyes of said main leaves in each case and curled slightly at the ends as shown at 31 in order that in the event of breakage of a main leaf the other members of the spring will take care of the load.

The detail of the attachment of the springs to the axle is a subsidiary element of the invention. In the case of the fore axle (see Fig. 2) the main leaf 36 and the support leaf 48 are set on the pad 32 which is integral with the axle structure, and are fixed thereto by a pair of U bolts 33 and 34. The U bolt 33 straddles the spring leaves and holds them down firmly to the pad. The leaves near their ends are nicked on either side as shown at 35, and the U bolt 34 sets in these nicks and so locks the leaves longitudinally on the pad 32, preventing endwise movement, and at the same time functions to bind the leaves down securely to the pad. As both leaves are thus locked together at their forward ends, means are provided for allowing a limited measure of longitudinal motion, the one relatively to the other, necessary to permit flexure, by making the main leaf 36 at the end of the spring which is fixed to the axle a half length only, and terminating it near the crown pad mounting, in an oval eye 37. This eye is carried in a jaw pivot 38 which is formed on the end of the bonding plate 39 which underlies the pad 20 and carries the securing nuts 40. A similar arrangement is used in the case of the rear axle as well as in the case of the fore axle (see Fig. 7). An alternative arrangement in the case where the torque tube system of transmission is used (as indicated in dotted lines in Fig. 1) consists in carrying the ends of the main and support spring leaves on shackle bolts 42 and 43 fixed in lugs 49 projecting from the suspension collars 44 which contain the axle casing, one of the leaves having an oval eye as shown at 45. In all cases of "Hotchkiss" drive, however, the arrangement more particularly seen in detail in Fig. 7 is adopted.

What I claim as my invention and desire to secure by Letters Patent is:—

1. A compound spring for an automobile, comprising, for either side of the frame thereof, an inverted suspension leaf spring rigidly fixed at its crown at a middle position on said frame, and two oscillating platform leaf springs pivotally mounted at their crowns on said frame forwardly and rearwardly of said suspension spring and having their ends respectively shackled to the ends of said suspension spring and their distant ends attached to the fore and rear axles of the automobile.

2. A compound spring for an automobile, comprising three leaf springs end-coupled in series and each secured at its crown to the frame of the vehicle, and characterized in that the distant ends of the outer springs respectively carry the fore and rear axles, that said outer springs are capable of oscillation on their crown mountings, and that said intermediate spring is held in a fixed crown mounting and suspends the adjacent ends of said outer springs.

3. A springing system for an automobile, comprising on either side of the vehicle two platform leaf springs respectively connected at their outer ends to and carrying the two axles and mounted at their crowns on pivotal attachments to the vehicle frame, and intermediate said platform springs, means for augmenting resiliency and lengthening the spring period comprising a leaf spring in alinement with each said platform spring, said leaf spring suspending the inner ends of said platform springs from the vehicle frame.

4. The combination with a vehicle frame and its axles, of an inverted longitudinally disposed suspension leaf spring rigidly fixed at its crown to an intermediate portion of the side of the vehicle frame, and two oscillating platform leaf springs having their central portions pivotally connected respectively to the side of the vehicle frame forwardly and rearwardly of the the first mentioned spring, the ends of the first mentioned spring being pivotally connected to the rear end of one of said platform springs and the front end of the other platform spring, and the other ends of said platform springs being connected to the axles.

5. A combination as defined in claim 4 in which the means pivotally connecting the central portions of the platform springs to the vehicle frame includes pintles arranged at right angles to each other to permit both longitudinal and transverse oscillation of the platform springs.

In testimony whereof I affix my signature.

CHRISTIAN FREDRIKSEN.